Oct. 8, 1957 H. D. GULNAC ET AL 2,809,326

ELECTRON BEAM DEFLECTION CIRCUITS

Filed March 30, 1954

INVENTORS
HOWARD D. GULNAC
BY LEO P. GRANT
ATTYS.

United States Patent Office 2,809,326

Patented Oct. 8, 1957

2,809,326

ELECTRON BEAM DEFLECTION CIRCUITS

Howard D. Gulnac, Santa Cruz, and Leo P. Grant, Los Alamos, N. Mex., assignors, by mesne assignments, to the United States of America as represented by the Secretary of the Navy Application March 30, 1954, Serial No. 419,936

4 Claims. (Cl. 315—27)

The present invention relates to circuits for producing a linear beam sweep for cathode ray tubes. More particularly, the invention consists of a novel circuit for automatically controlling the linearity of the sweep current for the beam deflection coils of cathode ray tubes. Such an accurate linear sweep current is particularly desirable where several cathode ray tube images must be superimposed.

The present invention has for its object the design of a circuit for producing an accurate linear sweep current for a deflection coil of a cathode ray tube.

A more specific object of this invention is an efficient sweep current generator for magnetically deflected cathode ray beams where considerable power and faithful linearity is required.

Figure 1:
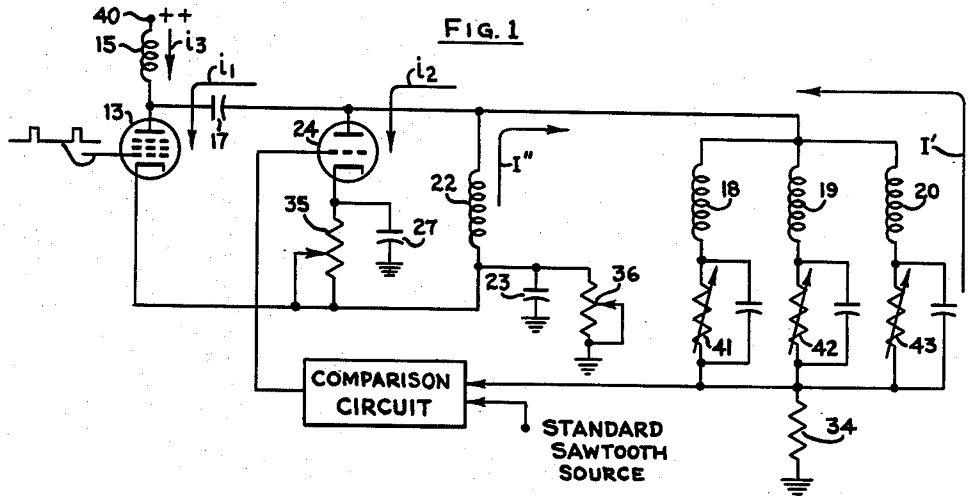
Figure 2:
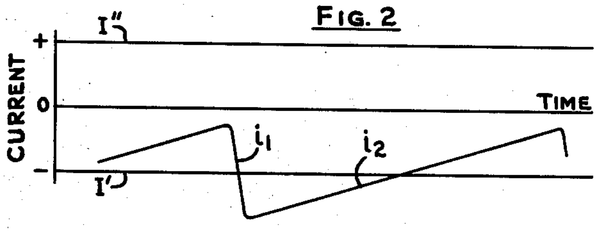
Figure 3:
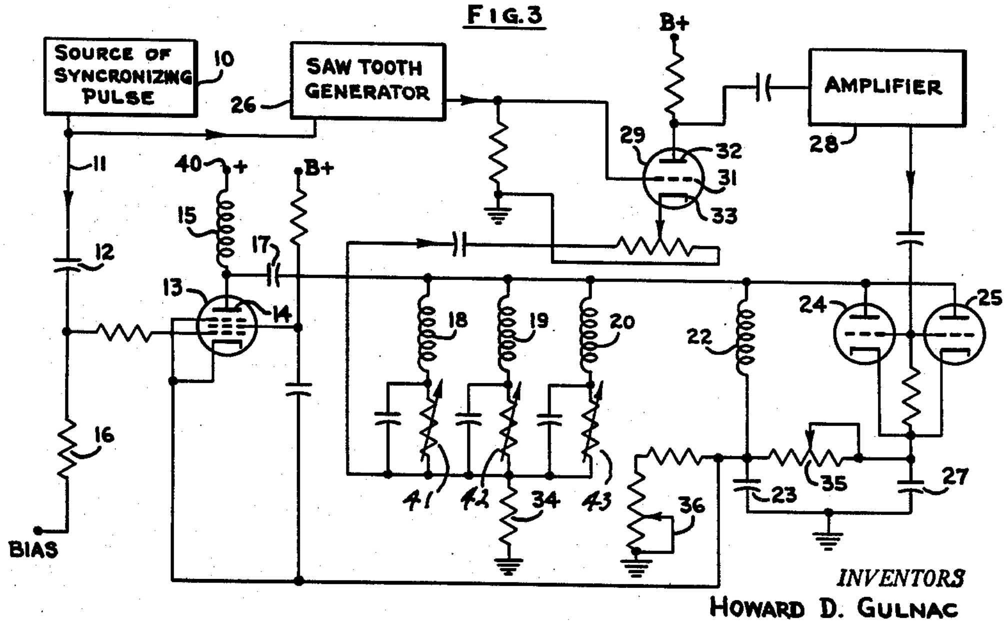

Other objects of this invention will become apparent from the following description of preferred embodiments of this invention illustrated in the accompanying drawings in which:

Figure 1 is a circuit diagram of the electrical relations of important elements of this invention, Figure 2 are graphs of important current relationships in the circuit of Figure 1, and Figure 3 is a complete circuit diagram of one sweep generator embodying this invention.

In general the invention provides a system in which a synchronizing pulse triggers an amplifying circuit which provides a large flow of current through the deflection coils of a cathode ray tube during the retrace time and simultaneously triggers a sawtooth wave forming circuit which produces a wave form with which the current wave form appearing in the deflection coils is compared and the difference is used to control the linearity of the trace producing current flowing through the deflection coils.

To produce the linear sweep current in a cathode ray deflection coil, for example, the horizontal sweep current, requires the application of a trapezoidal voltage wave form across the coil. In a circuit for producing such a current, the desired current in the deflection yoke is related to the sweep time by the relation $i=kt$, where $i$ is the current, $t$ is time, and $k$ is the slope of the desired curve. Therefore, $k$ may be defined as the rate of change of flow of the current, i. e.

$$\frac{di}{dt}=k$$

While the equation for the voltage across the deflection coils is $$e=L\frac{di}{dt}+iR$$

or on substituting for the values of $i$ and $$\frac{di}{dt}$$

in this equation where $e$ is the voltage, L is the inductance, R is the resistance, $i$, $k$, and $t$ are as defined above, the equation becomes $e=kL+Rkt$. From the above equations it is seen that pedestal voltage is equal to L$k$ while the slope of the sawtooth portion of the voltage wave should be $k$R and is produced by a voltage rise of $k$R$t$.

Deflection coils for mounting on the neck of a cathode ray tube are represented in Figure 1 as inductances 18, 19 and 20. These coils may comprise the inductances of one, two or more separate deflection systems. Power for producing sawtooth current waves to the coils 18, 19 and 20 is supplied from direct current source 40, which source charges condenser 17. The intermittent pulsing of tube 13 causes current $i_1$ to flow through the deflecting coils 18, 19 and 20, through condenser 17 and through tube 13. The inductance 15, between the power source 40 and the anode of power tube 13, has relatively high inductance as does also inductance 22 which is in parallel with the deflection coils as far as A. C. components of current are concerned, thus the A. C. current flowing in these highly inductive paths is small at the time $i_1$ is flowing. Tube 13 is normally biased to cutoff but may momentarily pass high current when positive synchronizing pulses are applied to the control grid of the amplifier. The cathode end of inductance 22 is coupled to ground through the condenser 23 of very high capacitance. The opposite end of inductance 22, in addition to being coupled to the deflection coils is connected to the anode of damper tube 24 and is coupled through blocking condenser 17 to the anode of the pulse amplifier.

The pulse current $i_1$ through amplifier 13 is added to the damper current $i_2$ through tube 24, to produce a periodic current through the deflection coils of sawtooth wave form, as suggested in Figure 2. The average integrated value of $i_1$ and $i_2$, which flows in one direction only, will be current I′ and will be entirely on one side of zero deflection current. Hence the center of deflection will be displaced from the center of the screen. It remains now merely to add a current I″ of equal value and opposite polarity to the deflection coil current. A steady current I″ is conveniently supplied from the high capacity condensers 23 and 27. Currents I′ and I″ flow in opposite directions through the deflection coils 18, 19 and 20 and through separately adjustable center resistors 41, 42 and 43, and hence through the common resistor 34 to ground. Capacitors 23 and 27, variable resistor 35 and inductance 22 comprise a filter for filtering out the $i_1$, $i_2$ components of current I′. The principal function of resistor 35 is to set the potential of the cathode to produce the correct amount of step voltage on the trapezoidal wave shape. The current $i_3$, flowing from the power supply through inductance 15, flows through the circuit in such a direction as to keep condensers 23 and 27 charged and provide ample centering current. The resistor 36 is in parallel with the coil path to ground, and provides a path to ground for this excess current.

Good results have been obtained with this invention when embodied in the specific circuitry of Figure 3 where the rate of decay of the sawtooth, during trace time, is controlled by a sawtooth wave applied to the control grid of the damper tube.

Such a circuit consists of a source of synchronizing pulses 10 which supplies a positive synchronizing pulse on lead 11. This synchronizing pulse is applied through a blocking condenser 12 to the grid of the power amplifier tube 13 and to the sawtooth generator 26. Tube 13 has connected between its plate 14 and the high voltage source a high inductance 15 which in the specific circuit shown is of the order of .5 henry. This inductance 15 serves to limit the flow of current from the high voltage source when there is a rapid change in the current drawn by tube 13. Tube 13 has a grid biasing resistor 16 connected between the grid and a source of bias such that the normal operating state tube 13 is self biased substantially below cut off between pulses. The bias source prevents excessive current in tube 13 if the synchronizing pulses should fail. The plate of tube 13 may be connected through a large capacitor 17, having a capacity of the order of 2 microfarads, to one or more deflection coils, such as coils 18, 19, and 20, having a combined inductance of the order of 4 millihenrys. Each of these deflection coils has a centering resistor 41, 42, and 43 of about 200 ohms each which are connected to ground through a resistor 34 of 3.3 ohms, and whose purpose will be explained later. The centering resistors each have the necessary by-pass condensers to provide a low impedance path for any fluctuating current components. Connected from the high potential side of the deflection coils to ground through a capacitor 23, having a capacity, in this embodiment, of 500 microfarads is the inductance 22, of the order of 1 henry. One or more damper tubes 24 and 25 have plates which are connected to the high potential side of the deflection coils and to the inductance 22, while their cathodes are connected through a 500 microfarad condenser 27 to ground and to the other side of the inductance 22.

In the operation of the above described sweep circuit the tube 13 is normally biased to below cut off, but when the positive synchronizing pulse is applied to the grid from the source 10 the tube is caused to conduct heavily. Tube 13 should have the current capacity of the commercial 6BG6 type. Since the plate circuit of tube 13 is connected through a large inductance to the high voltage source the tube can draw only a small current from the source during the build up of the current through tube 13. However, when the tube begins to conduct, the voltage at the plate begins to drop very rapidly. This drop causes the condenser 17 to discharge through the tube which in turn causes a large current to flow through the deflection coils. This large current stores energy in the magnetic field of the coils during the allowable retrace time of the sawtooth wave. This condition follows from the fact that the total inductance of coils 18, 19 and 20 is much less than the inductance of 15. The flow of current through the tube 13 also causes a drop in potential at the plate and a constant lowering of the plate potential on the damper tube 24 and 25 with respect to their cathodes, thus during the time the triggering pulse persists and the tube 13 is conducting the potential on the plates of the damper tubes 24 and 25 is negative with respect to their cathodes. This prevents any flow of current through the tubes 24 and 25 during the period tube 13 is conducting. However, as soon as tube 13 ceases to conduct, the potential on the plate of tube 13 rises, which also raises the potential on the plates of tubes 24 and 25. As this potential becomes positive with respect to the cathodes of tubes 24 and 25, these tubes begin to conduct and the trace portion of deflection starts. The cathode potential is controlled by resistor 35 and is adjusted to give the proper step voltage. The energy stored in the magnetic fields of the deflection yokes induce a current in the deflection coil circuit which flows through tubes 24 and 25 and through the coils in the same direction as the flow which took place while tube 13 was conducting. The sawtooth of current thus produces the necessary magnetic field to move the trace for proper deflection except it is not centered. Current necessary to center the trace is secured from the charging of condensers 23 and 27, these condensers having been charged by the instantaneous current flowing through tube 13 during retrace time and through tubes 24 and 25 during trace time. Condensers 23 and 27 provide a source for centering current which flows through the inductance 22, then through yokes 18, 19 and 20, through individual centering controls, and through resistor 34 to ground. A current also flows from the high voltage power supply 40 through inductance 15, this additional current provides more than enough to center the sweep so resistor 36 provides an adjustable shunt path to ground for that current not needed for centering.

The above described operation provides for a sweep trace for a cathode ray tube, however, its linearity is not assured. Therefore, to provide for regulating the linearity of the trace there is provided a sawtooth generator 26 which is triggered simultaneously with the tube 13. There is also provided a resistance 34 in series with the deflection yokes to provide a voltage wave form corresponding to the current wave form appearing in the yokes. This wave form is applied to a comparator circuit together with the sawtooth wave form from the sawtooth generator 26. The comparator comprises a tube 29 which has applied to its grid 31 the sawtooth wave form from the sawtooth generator and has applied to its cathode the wave form from the yokes. Any variation between these wave forms will appear as an output voltage from the comparator which is amplified and applied to the control grids of tube 24 and 25 to control the discharge rate of the current produced in the deflection yokes during the trace time.

In the above described circuit the values given to the components are illustrative only and are not restrictive of the invention. They are not intended to limit the selection of such values as may be applicable to the particular embodiment of the invention desired depending on such considerations as the sweep rate, voltages available, et cetera.

What is claimed is:

1. A deflection system comprising an inductive deflection yoke, a storage condenser, an inductance device having a relatively large inductive value compared to the inductive value of said yoke, a high voltage power source, a grid controlled power amplifier, and the inductance device and yoke being connected in series across said condenser, said power source and amplifier being coupled in series across said condenser, and a synchronizing pulse source connected to the control grid of said power amplifier to intermittently store energy in the mentioned condenser; and means to intermittently dissipate the stored energy comprising a second condenser and a grid controlled damper tube connected to charge said second condenser, said means being coupled across said inductance device.

2. The system defined in claim 1 further comprising a saw-tooth wave source synchronized with said pulse source, means for sampling the current flowing in said yoke, means comparing the wave form of the sampled current with the wave form of the saw-tooth wave source, and means responsive to the instantaneous differences of the compared waves for varying the bias on said damper tube.

3. A cathode ray tube deflection system for passing a current of sawtooth wave form through an inductive load, the trace and retrace currents being symmetrically positive and negative about zero current, the system comprising a pair of condensers of relatively large capacitance, and an inductance device of relatively large inductive reactance compared to the reactance of said load, a first of said condensers and the inductance device being connected in series across said load, a grid controlled power tube and a grid controlled damper tube coupled in parallel across said inductance device, the second of said condensers being connected in series with said damper tube and across said load, a coupling condenser between the anodes of said tubes, a source of pulses of short duration coupled to the grid of the power tube for substantially short-circuiting said inductance device during retrace time, and a source of sawtooth voltage coupled to the grid of the damper tube to draw regulated current from said condensers during trace time.

4. A system for driving undulatory current symmetrically positive and negative of sawtooth wave form through a cathode ray deflection coil, said system comprising a plurality of storage condensers of relatively large capacity connected in a filter network, an inductance device of high inductive reactance compared to the reactance of said deflection coil, means connected to said condensers to maintain the charge of the condensers of a relatively steady value, the deflection coil being connected across the output of said condenser filter network through said inductance device to draw a steady predetermined current from the condenser filter network; and means for drawing current of sawtooth wave form from said condenser filter network through said inductance device including a grid controlled damper tube coupled across said inductance device and a source of sawtooth voltage coupled to the grid of the damper tube, the average value of the sawtooth current being substantially equal to said predetermined current.

References Cited in the file of this patent

UNITED STATES PATENTS

| | | |
|---|---|---|
| 2,574,732 | Denton | Nov. 13, 1951 |
| 2,621,237 | Huntley | Dec. 9, 1952 |
| 2,637,832 | Roger | May 5, 1953 |
| 2,654,855 | Denton | Oct. 6, 1953 |
| 2,728,875 | Kihn | Dec. 27, 1955 |